United States Patent
Gane et al.

(10) Patent No.: US 10,472,522 B2
(45) Date of Patent: Nov. 12, 2019

(54) PROCESS FOR MANUFACTURING AQUEOUS SUSPENSIONS OF MINERAL MATERIALS OR DRIED MINERAL MATERIALS, THE OBTAINED PRODUCTS, AS WELL AS USES THEREOF

(71) Applicant: Omya International AG, Oftringen (CH)

(72) Inventors: Patrick A. C. Gane, Rothrist (CH); Matthias Buri, Rothrist (CH); Beat Karth, Oberoenz (CH); Samuel Rentsch, Spiegel bei Bern (CH)

( * ) Notice: Subject to any disclaimer, the term of this patent is extended or adjusted under 35 U.S.C. 154(b) by 0 days.

(21) Appl. No.: 15/951,657

(22) Filed: Apr. 12, 2018

(65) Prior Publication Data
US 2018/0230313 A1   Aug. 16, 2018

Related U.S. Application Data

(62) Division of application No. 12/998,788, filed as application No. PCT/EP2009/067310 on Dec. 16, 2009, now Pat. No. 9,969,888.

(60) Provisional application No. 61/249,771, filed on Oct. 8, 2009.

(30) Foreign Application Priority Data

Dec. 19, 2008 (EP) ..................... 08172465

(51) Int. Cl.
| C09C 1/02 | (2006.01) |
| C09C 3/04 | (2006.01) |
| C09C 1/04 | (2006.01) |
| D21H 17/69 | (2006.01) |
| D21H 19/42 | (2006.01) |

(52) U.S. Cl.
CPC .............. *C09C 1/021* (2013.01); *C09C 1/043* (2013.01); *C09C 3/041* (2013.01); *D21H 17/69* (2013.01); *C01P 2002/72* (2013.01); *C01P 2004/61* (2013.01); *C01P 2004/62* (2013.01); *C01P 2006/12* (2013.01); *C01P 2006/22* (2013.01); *D21H 19/42* (2013.01)

(58) Field of Classification Search
CPC ......... C08K 3/26; C09D 133/02; C08L 33/02; C09C 1/02; C09C 3/04; C09C 1/04
USPC ....................................... 524/425
See application file for complete search history.

(56) References Cited

U.S. PATENT DOCUMENTS

| 3,006,779 A | 10/1961 | Leaf et al. |
| 4,840,985 A | 6/1989 | Gonnet et al. |
| 5,145,902 A | 9/1992 | Ravet et al. |
| 5,181,662 A | 1/1993 | Bousquet et al. |
| 5,432,239 A | 7/1995 | Egraz et al. |
| 6,767,973 B2 | 7/2004 | Suau et al. |
| 2003/0045647 A1* | 3/2003 | Suau .................. B01F 17/0028 525/329.7 |
| 2006/0148951 A1 | 7/2006 | Qiu et al. |
| 2006/0162884 A1 | 7/2006 | Gane et al. |
| 2006/0287423 A1* | 12/2006 | Michl ..................... B02C 23/06 524/425 |
| 2009/0209692 A1 | 8/2009 | Suau et al. |

FOREIGN PATENT DOCUMENTS

| EP | 0046573 A1 | 9/1982 |
| EP | 0100947 A1 | 2/1984 |
| EP | 0100948 A1 | 2/1984 |
| EP | 0129329 A2 | 12/1984 |
| EP | 0261039 A1 | 8/1986 |
| EP | 0412027 A | 2/1991 |
| EP | 0412027 A1 | 2/1991 |
| EP | 0542643 A1 | 5/1993 |
| EP | 0542644 A | 5/1993 |
| EP | 0542644 A1 | 5/1993 |
| EP | 0717051 A1 | 6/1996 |
| EP | 0850685 A2 | 7/1998 |
| FR | 2903618 A | 1/2008 |
| WO | 9112278 A1 | 8/1991 |
| WO | 0249766 A2 | 6/2002 |
| WO | 2006081501 A | 8/2006 |
| WO | 2006081501 A1 | 8/2006 |
| WO | 07072168 A1 | 6/2007 |
| WO | 2007141269 A | 12/2007 |
| WO | 08010055 A1 | 1/2008 |
| WO | 2008010055 A1 | 2/2008 |

OTHER PUBLICATIONS

Richard J. Lewis, Sr., Hawley's Condensed Chemical Dictionary, 1997, Van Nostrand Reinhold, 13th Edition, p. 895.*
Notice of Opposition dated Mar. 19, 2014 in connection with European Patent Application No. 09 796 366.4, 1-20.
Ruiz-Agudo, E. et al., entitled "Interactions of Lithium-Bearing Solutions with Calcite during Dissolution," macla No. 11, Sep. 2009 revista de la sociedad espanola de mineralogia, 169-170.
Mayne, C.D., entitled The Limnology of Three Limestone Rock Quarries in East-Central Nebraska and Western Iowa Transactions of the Nebraska Academy of Sciences, 21, 1994, 1-7.
Rajam, S. et al., entitled "Selective Stabilization of the (001) Face of Calcite in the Presence of Lithium," J. Chem. Soc., Chem. Commun., 1990, 1789-1792.
Meyers Konversations-Lexikon, Fourth Edition, 1885-1892, vol. 10, p. 835, in internet since 2005, keyword "lithium."
Römpp-Lexikon Chemie, Band 3, H-L, 1997, Stichwort "Kalke."
Developments in Soil Science (Book 7), 1980.

(Continued)

*Primary Examiner* — Deve V Hall
(74) *Attorney, Agent, or Firm* — Heslin Rothenberg Farley & Mesiti P.C.

(57) ABSTRACT

The invention relates to a process for manufacturing aqueous mineral material suspensions or dried mineral materials using at least one lithium ion neutralised water-soluble organic polymer, the ground mineral materials obtained by this process, the use of the mineral materials in paper, paints and plastics, as well as the use of the lithium ion neutralised water-soluble organic polymer in the manufacturing process as a dispersing and/or grinding enhancer.

17 Claims, No Drawings

(56) References Cited

OTHER PUBLICATIONS

Römpp-Lexikon Chemie, Band 1, A-Cl, 1996, Stichwort "Calciumcarbonat."
Pastero, L. et al., entitled "Morphology of Calcite (CaC03) Crystals Growing from Aqueous Solutions in the Presence of Li+ Ions," Surface Behavior of the {0001} Form. Crystal Growth & Design 2004, vol. 4, No. 3, 485-490.
Vlasov, A. S. et al., entitled "Science for Ceramic Production, Sintering of Calcium Carbonate in the Presence of Lithium Carbonate Additive," Glass and Ceramics, vol. 54, Nos. .11-12, 1997, 387-389.
Forschungsbericht 107 01 016/01 "Schwermetalle and andere Schadstoffee in Düngemitteln," 1992.
Römpp-Lexikon Chemie, Band 1, A-Cl, 1996, Stichwort "Calcit."
Römpp-Lexikon Chemie, Band 1, A-Cl, 1996, Stichwort "Aragonit."
The International Search Report dated Feb. 11, 2010 for PCT Application No. PCT/EP2009/066223.
The Written Opinion of the International Searching Authority for PCT Application No. PCT/EP2009/066223.
Vlasov et al., entitled "Science for Ceramic Production, Sintering of Calcium Carbonate in the Presence of Lithium Additive," Glass and Ceramics; vol. 54, Nos. 11-12, 1997.
The Search Report dated Jun. 18, 2009 for corresponding European Application No. EP 2199348.
The Written Opinion dated Feb. 18, 2010 for corresponding European Application No. EP 2199348.
The International Search Report dated Mar. 15, 2010 for PCT Application No. PCT/EP2009/067395.
The Written Opinion of the International Searching Authority dated Mar. 15, 2010 for PCT Application No. PCT/EP2009/067395.
Lewis, Richard J., Sr., Hawley's Condensed Chemical Dictionary, Van Nostrand Reinhold, 13th Edition, p. 895.
Skuse, D.R., "New Polymeric Dispersants for Very Fine Calcium Slurries," Royal Science of Chemistry, 2002, pp. 38-45.
Lewis, Richard J., Sr., Hawley's Condensed Chemical Dictionary, 14th Edition, 2002, John Wiley & Sons. Online version available at: http://knovel.com/web/portal/browse/display?_EXT_KNOVEL_DISPLAY_bookid=704&VerticalID=0.

* cited by examiner

PROCESS FOR MANUFACTURING AQUEOUS SUSPENSIONS OF MINERAL MATERIALS OR DRIED MINERAL MATERIALS, THE OBTAINED PRODUCTS, AS WELL AS USES THEREOF

CROSS-REFERENCE TO RELATED APPLICATIONS

This is a divisional of U.S. application Ser. No. 12/998,788, filed Jul. 21, 2011, which is a U.S. National Phase of PCT Application No. PCT/EP2009/067310, filed Dec. 16, 2009, which claims priority to U.S. Provisional Application No. 61/249,771, filed Oct. 8, 2009, and European Application No. 08172465.0, filed Dec. 19, 2008, the contents of which are hereby incorporated by reference.

The present invention relates to the technical sector of suspensions of mineral material or dried mineral materials and their applications in the fields of paper, paint and plastics and more particularly their applications in the paper industry, like the manufacture or the coating of paper sheets.

In the manufacturing method of a sheet of paper, cardboard or analogous product, one skilled in the art increasingly tends to replace part of the expensive cellulose fibres by cheaper mineral matter in order to reduce the cost of the paper while improving its properties such as opacity and/or brightness.

This mineral material, with which one skilled in the art is well familiar comprises, for example natural calcium carbonate such as marble, calcite, limestone and/or chalk, and/or synthetic calcium carbonate such as scalenohedral and/or aragonitic and/or calcitic crystal forms and miscellaneous analogous fillers containing calcium carbonates such as dolomite or mixed carbonate based fillers of various metals such as, in particular, calcium associated with magnesium and analogues, various matter such as talc or analogues, and mixtures of these fillers, such as, for example talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

For a long time now, it has been quite common to use in a wet grinding process, as a grinding aid agent, water soluble polymers based on partially or totally neutralised polyacrylic acid or its derivatives (EP 0 046 573, EP 0 100 947, EP 0 100 948, EP 0 129 329, EP 0 261 039, EP 0 516 656, EP 0 542 643, EP 0 542 644, EP 0 717 051) to provide aqueous mineral suspensions that meet the above-mentioned refinement and viscosity criteria, but these grinding aid agents are used in a too high quantity to allow the final product to have sufficient capability of developing scattering visible light as required by the end user in paper application.

The teaching of these documents is that there is a need for lowering the polydispersity of the polymers used as dispersing and/or grinding aid agents, which is a drawback with respect to the high cost and to the difficulty of producing the corresponding polymers.

Accordingly, there is a need for water-soluble organic polymers whatever their polydispersity.

Another drawback of the known wet grinding process performed with the conventional polymers lies in the fact that they do not allow to obtain the requested stability of the pH of the aqueous mineral suspensions over time.

The skilled man knows another type of solution disclosed in WO 02/49766, EP 0 850 685, WO 2008/010055, WO 2007/072168 to obtain aqueous suspensions of refined mineral material, with a dry matter concentration that can be high, while having a low Brookfield™ viscosity that remains stable over time. This known type of solution disclosed the use of specific dispersants like copolymers of acrylic acid with maleic acid or like particular rate of neutralization or like the use of inorganic fluorine compound used to put into aqueous suspension of the mineral particles issuing from the mechanical and/or thermal upconcentration step following a step of wet grinding at a low solid content without the use of dispersing agent nor grinding aid.

Additionally, the skilled man in the art knows the U.S. Pat. No. 3,006,779, which discloses a completely different solution based on an inorganic dispersant consisting of a homogeneous mixture of sodium phosphate glass, zinc oxide and a potassium or lithium salt or hydroxide.

Finally, the dissertation entitled "Influence of polyelectrolyte adsorption on rheology of concentrated calcite dispersion" (Robert Petzenhauser—1993) which studies the influence of different polyacrylates with regard to the calcite suspension confirms that difficulties are existing in term of the stability of viscosity of the resulting suspensions with all the studied polyacrylates, including lithium polyacrylates.

Accordingly, none of the known solutions provides the skilled man with a solution to the problem of achieving aqueous suspensions of refined mineral material allowing the use of water-soluble organic polymers whatever their polydispersity, with a dry matter concentration that can be high, while having at once a low Brookfield™ viscosity that remains stable over time, a reduced dispersant and/or grinding aid agent content and/or thermally and/or mechanically increased solid content, as well as a pH stability over time Faced with the above-mentioned problem of achieving the aqueous mineral material suspensions with the required properties while minimizing the dispersant and/or grinding aid agent demand without decreasing the properties of the final products like the optical properties of the paper, the Applicant has found surprisingly that lithium-neutralised water-soluble organic polymers act as grinding and/or dispersing capacity enhancers, permitting to achieve aqueous suspensions or "slurries" of said refined mineral material with a dry solid concentration that can be high, while having at once a low Brookfield™ viscosity that remains stable over time, a reduced dispersant or grinding aid agent amount as well as a pH stability over time.

The Applicant has also surprisingly found that the neutralisation of the water-soluble organic acidic polymer by lithium ion allows using, as grinding and/or dispersing capacity enhancer, water-soluble organic polymers with larger polydispersity than commonly used.

In some difficult conditions of grinding or dispersing, the lithium-neutralised water-soluble organic polymers acting as grinding and/or dispersing capacity enhancer, allow to achieve aqueous suspensions or "slurries" of said refined mineral material while the conventional polyacrylates are not allowing obtaining any fluid and/or stable slurries due to a too high Brookfield viscosity.

Thus, one aspect of the present invention is to provide a manufacturing method of aqueous suspension of mineral particles at reduced dispersant content and/or thermally and/or mechanically increased solid content, having a low Brookfield™ viscosity being stable over time, having a high dry solid content, a reduced amount of dispersant or grinding aid agent, which may have a higher polydispersity, compared to conventional dispersant as well as a pH stability over time.

By low Brookfield™ viscosity remaining stable over time it is understood that the initial Brookfield™ viscosity of the aqueous mineral material suspension after 1 hour of production is below 4000 mPa·s, preferably below 2000 mPa·s, more preferably below 500 mPa·s measured after 1 minute of stirring by the use of a RVT model Brookfield™ viscosimeter at room temperature and a rotation speed of 100 rpm (revolutions per minute) with the appropriate spindle, and that the Brookfield™ viscosity of the aqueous mineral material suspension after 8 days of unstirred storage is below 4000 mPa·s, preferably below 2000 mPa·s, more preferably below 500 mPa·s measured after 1 minute of stirring by the use of a RVT model Brookfield™ viscosimeter at room temperature and a rotation speed of 100 rpm with the appropriate spindle.

By reduced dispersant content, it is meant that the quantity of dispersant or of grinding aid agent used to achieve the mineral material in the form of the aqueous suspension at a certain Brookfield™ viscosity is lower than the one used by using conventional dispersant or grinding aid agent to achieve the mineral material suspension at the same value of Brookfield™ viscosity and at the same value of solid content.

In this respect "higher polydispersity" likewise means that according to the invention the dispersants or grinding agents used to achieve the mineral material in the form of the aqueous suspension at a certain Brookfield™ viscosity may have a higher polydispersity than commonly used dispersants or grinding aid agents to achieve the mineral material suspension at the same value of Brookfield™ viscosity and at the same value of solid content. In other words, the dispersants or grinding aid agents of the present invention may provide a lower viscosity than conventional ones even at high polydispersity.

Conventional dispersants comprise well known polyacrylates as described in the different known documents or patents recited as prior art further below in the present application.

"pH stable over time" means that the mineral suspension will keep the same pH value in a low range of very preferably 9.5 to 10.5 during at least 8 days of storage.

"A high dry solids content" according to the present invention means an aqueous mineral material suspension or slurry having a solid content of preferably from 10 wt % to 82 wt %, more preferably from 50 wt % to 81 wt % and most preferably of from 65 wt % to 80 wt %, for example from 70 wt % to 78 wt % based on the total weight of the suspension or slurry.

The above object is achieved by a process for manufacturing aqueous mineral materials comprising the steps of:
a. providing at least one mineral material in the form of an aqueous suspension or in dry form,
b. providing at least one partially or totally lithium-neutralized water-soluble organic polymer,
c. combining the at least one partially or totally lithium-neutralised water-soluble organic polymer of step b) with the at least one mineral material of step a).

In this method, the lithium-neutralised water-soluble polymers act as grinding and/or dispersing capacity enhancers, wherein they act as dispersing capacity enhancers in cases were no grinding step as mentioned below is carried out, whereas they also act as grinding capacity enhancers were this step is carried out.

The resulting mineral material may be in a dry form or in the form of a suspension. They may be dried or resuspended after having been dried, as can be taken from any of the following preferred embodiments.

The at least one mineral material for use in the present invention preferably is selected from the group comprising natural calcium carbonate (GCC) such as marble, chalk, limestone or calcite or precipitated calcium carbonate (PCC) like aragonite, vaterite and/or calcite; and calcium carbonate-containing minerals such as dolomite or mixed carbonate based fillers such as calcium associated with magnesium such as talc or with clay, and mixtures thereof such as talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

Preferably, the at least one mineral material is a natural calcium carbonate (GCC) or a precipitated calcium carbonate (PCC) or a mixture of GCC and PCC, or a mixture of GCC and PCC and clay, or a mixture of GCC and PCC and talc, and most preferably is a GCC chosen among marble, chalk, calcite or limestone or a PCC chosen among aragonitic PCC or calcitic PCC like rhombohedral PCC or scalenohedral PCC.

The above process can be improved by a number of optional steps:

An especially preferred embodiment includes a grinding step (step d), wherein step c) can be performed before, during or after step d).

Furthermore, the at least one partially or totally lithium-neutralized water-soluble organic polymer can be added before and/or during and/or after step a), if the at least one mineral material is PCC.

Thus, the at least one partially or totally lithium-neutralized water-soluble organic polymer can also be added before, during or after the precipitation of the synthetic calcium carbonate. For example, the partially or totally lithium-neutralized water-soluble organic polymer can be added prior to the carbonisation step.

If GCC is used in step d), it may be preferred to subject the wet ground natural calcium carbonate to a wet beneficiation step prior to step d), allowing the removal of impurities, such as silicate impurities, for instance by froth flotation.

Thus, e.g., by grinding and/or dispersing methods at reduced dispersant content and/or increased solid content, manufacturing methods of aqueous suspension of mineral material particles implementing said partially or totally lithium-neutralized water-soluble organic polymer selected as grinding and/or dispersing capacity enhancers, the manufacturing process can be optimized.

Furthermore, it can be advantageous that the combined and optionally ground material obtained from step d) is screened and/or concentrated (step e).

"Screening" in the context of the present invention is implemented by the well known devices for "screening" like sieves, grit centrifuges, etc. By "screening", it has to be understood a beneficiation by removing coarse particles having a particle size of more than 45 μm. In the case where a suspension is screened such that at least part of the solid material in the original suspension is removed by screening, this screening step represents a dilution.

"Upconcentration" is conducted, e.g. by a thermal upconcentration or a mechanical upconcentration such as by means of a centrifuge, filter-press, tube-press or a mixture thereof.

If the combined and optionally ground material is screened and/or concentrated according to step e), it may be preferred to disperse the material in an aqueous medium subsequent to screening and/or concentrating (step f).

The combined and optionally ground material obtained from any one of steps d) or e) or f) may be dried, if the mineral material of step a) is provided in the form of an aqueous suspension (step g).

On the other hand, if the mineral material of step a) is provided in the dry form, or when steps e), f) and g) are not performed, the combined and optionally ground material obtained from step d) can be dispersed in an aqueous medium (step h).

In a preferred embodiment, the aqueous suspension obtained from step h) may be ground (step i), preferably in the presence of the partially or totally lithium neutralised water-soluble organic polymer.

Generally, regarding the addition of the at least one partially or totally lithium-neutralized water-soluble organic polymer, there are several preferred embodiments.

For example, the at least one partially or totally lithium-neutralized water-soluble organic polymer is preferably added before and/or during and/or after grinding step d), if steps e) and f) are not carried out.

The at least one partially or totally lithium-neutralized water-soluble organic polymer may however also be added after grinding step d) and before and/or during and/or after screening and/or concentrating step e), if step e) is performed alone.

Furthermore, it is possible to add the at least one partially or totally lithium-neutralized water-soluble organic polymer before and/or during and/or after dispersing step f).

If the mineral material is provided in the dry form in step a) followed successively by steps d) and h), it is preferred that the addition of the partially or totally lithium-neutralized water-soluble organic polymer is performed in one addition before, during or after step h) or is made in multiple additions, each of them before, during or after the step h).

If dispersing step f) is performed and if all or part of the quantity of the partially or totally lithium-neutralized water-soluble organic polymer is added before step f), the partially or totally lithium-neutralized water-soluble organic polymer is preferably added before and/or during and/or after the step d).

However, if there is no step e), f) or g), all of the quantity of the lithium ion neutralised water-soluble organic polymer may be used before step d), or a part of the lithium ion water-soluble organic polymer may be used before step d) while the remaining quantity is added during step d).

If dispersing step f) follows step e), step f) may be implemented in presence of the lithium ion neutralised water-soluble organic polymer, which can be different or the same as the one used in step d).

It is especially preferred that step d) of the process of the present invention is performed at a pH of above 7, preferably above 7.5, more preferably between 8.5 and 10.5, and most preferably between 9.5 and 10.5.

In this respect, the skilled man will easily determine that the pH value will have suitable values in function of the properties he wishes to achieve, knowing that it is influenced by the addition of a base, preferably of a base of a mono or divalent cation, most preferably of sodium or calcium, e.g. by the addition of an alkaline preparation of a biocide, or by the release of hydroxide, such a $Ca(OH)_2$, during grinding of a material, such as during the co-grinding of precipitated calcium carbonate and natural calcium carbonate.

In all the present application the value of the pH is measured at room temperature (21° C.±1) with an accuracy of ±0.3.

The at least one partially or totally lithium-neutralized water-soluble organic polymer preferably is selected from the group comprising acrylic or methacrylic acid homopolymers and/or copolymers of acrylic and/or methacrylic acid and/or copolymer of acrylic and/or maleic acid with one or more acrylic, such as acrylamide, and/or vinyl or allyl monomers totally or partially neutralised by a lithium ion containing base and/or salt thereof or by a combination of a lithium ion containing base and/or salt thereof with one or more of the neutralization agents having a monovalent neutralizing function or a polyvalent neutralizing function such as, for the monovalent function, those selected from among the group consisting of the alkaline cations, in particular sodium, potassium, ammonium or the primary, secondary or tertiary aliphatic and/or cyclic amines such as stearylamine, the ethanolamines (mono-, di-, triethanolamine), mono and diethylamine, cyclohexylamine, methylcyclohexylamine, aminomethylpropanol, morpholine or, for the polyvalent function, those selected from among the group consisting of alkaline earth divalent cations, in particular magnesium and calcium, or zinc or strontium, and of the trivalent cations, as in particular aluminium, or of certain cations of higher valency, and mixtures thereof.

In the context of the present invention whether or not a polymer is water soluble is determined by mixing this polymer, in an amount corresponding to the highest concentration to be used in the inventive process, in an aqueous environment at 25° C. until the turbidity, or lack thereof, is visually constant, and then filtering on 0.2 μm membrane filter. If there is less than 0.1% insoluble material, relative to total added polymer, remaining on the filter, the polymer is water soluble.

It has to be noted that the partially or totally lithium-neutralised water-soluble organic polymer can also be used in combination with prior art dispersant as described above.

Partially lithium neutralised in this context means that only a part of the acid groups of the polymer are neutralised by lithium ion while the rest of counter-ions of the dissociated acid groups are $H_3O^+$, or neutralised by other ions like, among others, alkali or earth alkali or earth metal ions such as Na, K, or such as Mg, Ca, Sr or Al and/or by ammonium hydroxide or amines and/or alkanol amines, such as for example triethanol amine, triisopropanol amine, 2-amino-2-methyl-1-propanol or mixtures thereof.

The lithium ion-containing base is preferably chosen among basic components like lithium hydroxide, or an oxide and/or salts thereof, in dry form or in solution, and will be implemented on the $H_3O^+$ containing monomer before polymerisation and/or on the $H_3O^+$ containing polymer during and/or after polymerisation of the monomer.

The molar rate of non-neutralised acid groups preferably is in the range comprised between 0% and 75%, more particularly between 0% and 50% and the molar rate of non-lithium neutralised acid groups is in the range comprised between 0% and 75%, more particularly between 0% and 50%, most preferably between 0% and 10%.

If the non-lithium neutralised acid groups are neutralised by magnesium ions, it is preferred that the neutralization rate of the active acid sites, including the terminal groups, by magnesium is between 0% and <40%, preferably between 0% and 30%, more preferably between 10 and 20%. It may, however, also be between >60 and 75%, e.g. 70%, and, in some cases it is preferred that no magnesium neutralized acid groups are present.

As the degree of neutralisation using the bivalent Mg cation is very much depending on the Mw of the polymer. It is especially interesting to have a high Mg neutralisation degree for a polymer of low Mw, and a low Mg neutralisation degree for a polymer of high Mw.

The at least one partially or totally lithium-neutralized water-soluble organic polymer, which may be added before, during and/or after step d), is preferably present in an amount of from 0.001 wt % to 5 wt %, preferably from 0.01 wt % to 2 wt %, and most preferably from 0.05 wt % to 1 wt %, relative to the total dry mineral.

Also, a combination of another conventional polymer, such as a conventional polyacrylate with the lithium ion neutralised water-soluble organic polymer is used or a combination of different lithium ion neutralised water-soluble organic polymers.

The homopolymer of acrylic or methacrylic acid as well as the copolymer of acrylic acid or methacrylic acid in combination with one or more of other acrylic, vinyl or allyl monomers are prepared according to the well known methods of radical polymerisation or copolymerization methods in solution, in direct or inverse emulsion, in suspension or precipitation in appropriate solvents, in the presence of known catalytic systems and transfer agents, or by means of controlled radical polymerization methods such as the method known as Reversible Addition Fragmentation Transfer (RAFT), the method known as Atom Transfer Radical Polymerization (ATRP), the method known as Nitroxide Mediated Polymerization (NMP), or the method known as Cobaloxime Mediated Free Radical Polymerization as well.

It also can be prepared by another variant, where the homopolymer or copolymer obtained from the copolymerization reaction may, before or after the total or partial neutralization reaction, be treated and separated into several phases, according to statistical or dynamic methods known to one skilled in the art, by one or more polar solvents belonging to the group consisting of water, methanol, ethanol, propanol, isopropanol, butanols, acetone, tetrahydrofurane or mixtures thereof.

It has to be noted that the nature of the monomers and the molecular weight of the polymers used in combination of the lithium ion-containing base will be easily chosen by the skilled man in function of the properties he wishes to achieve.

Such partially or totally lithium-neutralized water-soluble organic polymers are added to obtain an aqueous suspension of material with a low Brookfield™ viscosity stable over time, that means an initial Brookfield™ viscosity after 1 hour of production of less than 4000 mPa·s, more preferably less than 2000 mPa·s, most preferably less than 500 mPa·s, in the range of 50 to 500 mPa·s measured after 1 minute of stirring by the use of a RVT model Brookfield™ viscosimeter at room temperature (21° C.±1) and a rotation speed of 100 rpm (revolutions per minute) with the appropriate spindle, and a Brookfield™ viscosity of the aqueous mineral material suspension after 8 days of unstirred storage of below 4000 mPa·s, preferably below 2000 mPa·s, more preferably below 500 mPa·s at 100 rpm measured after 1 minute of stirring by the use of a RVT model Brookfield™ viscosimeter at room temperature (21° C.±1) and a rotation speed of 100 rpm with the appropriate spindle.

In this respect it is to note that contrary to commonly used polymers, such viscosities can be achieved with the partially or totally lithium-neutralized water-soluble organic polymers even, if they have high polydispersities such as more than 2, preferably from 2.5 to 4, more preferably from 2.7 to 3.5, even more preferably from 2.8 to 3.3, e.g. 3, and even up to 6.25 and higher.

In a preferred embodiment the mineral material comprises GCC and PCC, wherein the PCC is present in amount of from 10 to 90 wt %, preferably from 20 to 80 wt %, and most preferably from 30 to 70 wt %, based on the total weight of PCC and GCC.

Grinding step d) of the process according to the present invention preferably is performed at a temperature of above 20° C., more preferably of from 50° C. to 120° C., especially of above 60° C., for example of from 80° C. to 105° C.

Furthermore, it is preferred that the solids concentration of material in the form of an aqueous suspension to be ground in grinding step d) is from 10 to 82% (by dry weight of mineral material), preferably from 40 to 81%, most preferably from 60 to 80%, and especially preferably between 65% and 72%.

Said aqueous suspension may result from the dispersion of mineral material in the form of a wet cake.

Especially preferably, step d) is performed at a solids content of from 10 wt % to 35 wt %, based on the total weight of the suspension, in the absence of any dispersants or grinding aids, and is performed at a solids content of from 60 wt % to 82 wt %, based on the total weight of the suspension, in the presence of dispersants and/or grinding aids.

The final solids content of the mineral material containing suspension ranges between 45 wt % and 82 wt %.

Preferably, the mineral materials have a high final solids content ranges between 60 wt % and 75 wt %, more preferably between 68 wt % and 73 wt %, if grinding step d) is performed without any dispersant nor grinding aid, and ranges between 65 wt % and 82 wt %, preferably between 72 wt % and 78 wt %, if grinding step d) is performed in the presence of dispersants or grinding aids.

Another object of the present invention is the provision of a mineral material obtained by the process according to the invention.

This mineral material preferably is in the form of an aqueous suspension having a solids content of 80 to 82% by dry weight of mineral material, eg. 80.5% by dry weight of mineral material.

It is especially preferred that this material contains at least one partially or totally lithium-neutralized water-soluble organic polymer in an amount of from 0.001 wt % to 5 wt %, preferably from 0.01 wt % to 2 wt %, and most preferably from 0.05 wt % to 1 wt %, e.g. 0.5 wt %, relative to the total dry mineral.

Furthermore, the optionally ground mineral material may comprise a fraction of particles finer than 2 μm of more than 50 wt %, preferably of more than 80 wt %, more preferably of more than 85 wt %, even more preferably of more than 98 wt %, based on the total weight of optionally ground material, using a Sedigraph™ 5100.

In this respect, it is especially preferred, if the mineral material comprises a fraction of particles finer than 2 μm of between 57 and 63 wt %, based on the total weight of material, using a Sedigraph™ 5100.

It may also comprise a fraction of particles finer than 1 μm of more than 20 wt %, preferably 75 wt %, more preferably of more than 85 wt %, more than 95 wt %, based on the total weight of combined and optionally ground material, using a Sedigraph™ 5100.

In a preferred embodiment, the final mineral material has a $d_{50}$ of from about 0.2 to 2 μm, preferably from 0.2 to 0.8 μm, and more preferably from 0.25 to 0.45 μm. The $d_{50}$ value is determined using a Sedigraph 5100™.

Preferably, the combined and optionally ground mineral material presents a content of 0.02 to 0.2 mg/m$^2$ of lithium-neutralised water-soluble organic polymer, such as 0.036 to 0.038 mg/m$^2$ for GCC, 0.063 mg/m$^2$ for rhombohedral PCC and 0.12 mg/m² for scalenohedral PCC by unity of specific surface area measured by means of the BET method according to the standard ISO 4652.

In an especially preferred embodiment the aqueous suspension of combined and optionally ground mineral material obtained by the process according to the invention has a Brookfield™ viscosity, which is stable over time, wherein the initial Brookfield™ viscosity after 1 hour of production is below 4000 mPa·s, preferably below 2000 mPa·s, more preferably below 500 mPa·s, e.g. between 50 and 500 mPa·s, measured after 1 minute of stirring by the use of a RVT model Brookfield™ viscosimeter at room temperature and a rotation speed of 100 rpm (revolutions per minute) with the appropriate spindle, and the Brookfield™ viscosity after 8 days of unstirred storage is below 4000 mPa·s, preferably below 2000 mPa·s, more preferably below 1000 mPa·s, especially below 500 mPa·s, e.g. between 50 and 500 mPa·s, measured after 1 minute of stirring by the use of a RVT model Brookfield™ viscosimeter at room temperature and a rotation speed of 100 rpm with the appropriate spindle.

In view of the above an aqueous suspension of mineral material, especially as defined above, is a further object of the invention. Especially preferred is an aqueous suspension of mineral material, which
has a solids content of 80 to 82% by dry weight of mineral material, e.g. 80.5% by dry weight of mineral material;
has a Brookfield viscosity of between 50 and 500 mPa·s measured at 100 rpm; and
comprises, preferably 0.25 to 0.5 wt %, more preferably 0.3 to 0.4 wt %, relative to the dry weight of mineral, at least one water-soluble organic polymer, preferably having a weight average molecular weight between 3000 and 12000 g/mol, and in which at least 90% of the carboxylic groups are neutralized with lithium ions.

The preferred mineral material in such suspensions comprises calcium carbonate selected from marble, chalk, limestone, or mixtures thereof.

Generally, combined and optionally ground mineral material in a dry form after step g) preferably comprises mineral containing calcium carbonate and is selected from the group comprising natural calcium carbonate (GCC) such as marble, chalk, limestone or calcite or precipitated calcium carbonate (PCC) like aragonite, vaterite and/or calcite, and calcium carbonate containing minerals such as dolomite or mixed carbonate based fillers such as, in particular, calcium associated with magnesium and analogues or derivatives, various matter such as clay or talc or analogues or derivatives, and mixtures of these fillers, such as, for example talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

Preferably, the material is a GCC or a precipitated calcium carbonate (PCC) or a mixture of GCC and PCC, or a mixture of GCC and PCC and clay, or a mixture of GCC and PCC and talc.

Most preferably, it is a GCC chosen among marble, chalk, calcite or limestone or a PCC chosen among aragonitic PCC or calcitic PCC like rhombohedral PCC or scalenohedral PCC.

Finally, another object of the present invention is the use of the aqueous mineral material suspensions and/or dried mineral material according to the invention, in any sector making use of mineral material, and notably in the field of paper, paint and plastics and any other field using said suspensions and/or powders, more particularly being used as slurries in paper applications such as paper making and/or paper coating and/or surface treatment of the paper or such as the filler during the manufacture of the paper, cardboard, or analogous sheets. The dried powders are preferably used in plastic and/or paints but also be re-suspended in water to form a suspension again. The use as filler can be direct as composition of filler during manufacture of the paper, cardboard, or analogous sheets or indirect as recycling composite of coating brokes, if the recycling composites of coating brokes are used in the manufacturing process of the paper, cardboard, or analogous sheets.

Especially preferred is the use in paper, paper coating colors, paints and plastics.

The papers, the paints, paper coating colors, and the plastics according to the invention are characterized in that they contain said combined and optionally ground mineral materials or suspensions thereof according to the invention.

An especially preferred embodiment in this respect is a coating color containing mineral materials according to the invention or an aqueous suspension thereof having a solids content of 75 to 78% by dry weight of mineral material, e.g. 77% by dry weight of mineral material, and preferably having a Brookfield viscosity at 100 rpm of <2000 mPa·s, and more preferably of <1000 mPa·s, e.g. 500 mPa·s.

These coating colors may furthermore comprises a synthetic binder having particles with a diameter of between 0.08 to 0.12 μm.

The scope and interest of the invention will be better perceived thanks to the following examples which are intended to illustrate certain embodiments of the invention and are non-limitative.

EXAMPLES

Example 1

This example relates to the preparation of the material to be processed according to the present invention.

All particle sizes and median diameters are measured using Sedigraph™ 5100, Micromeritics.

All weight molecular weights (Mw), number molecular weights (Mn) and corresponding polydispersity of the different polymers are measured as 100 mol % sodium salt at pH 8 according to an aqueous Gel Permeation Chromatography (GPC) method calibrated with a series of five sodium polyacrylate standards supplied by Polymer Standard Service with references PSS-PAA 18 K, PSS-PAA 8K, PSS-PAA 5K, PSS-PAA 4K and PSS-PAA 3K.

The BET specific surface area in m²/g is measured according to the standard ISO 4652 method.

Tests 1a and 1b:

This test concerns the preparation of a rhombohedral (R-) PCC of a $d_{50}$ of 0.3 μm.

In view of such, 200 kg of calcium oxide (Tagger Kalk, Golling A) are added to 1700 litres of 40° C.-tap water in a stirred reactor; the reactor contents are mixed under continuous stirring for 30 minutes and the resulting slurry of calcium hydroxide ("milk of lime") at 13.1% w/w solids is then screened on a 100 μm screen.

The calcium carbonate precipitation is conducted in a 1800 litre cylindrical stainless steel reactor equipped with an agitator and probes for monitoring the pH and conductivity of the suspension.

1700 litres of the calcium hydroxide suspension obtained in the slaking step as stated above are added to the carbonating reactor and the temperature of the reaction mixture is adjusted to the desired starting temperature of 16° C.

A gas of 20-30% by volume of $CO_2$ in air is then bubbled upwards through the suspension at a rate of 200 m³/h under a suspension agitation between 200 and 300 rpm. Overpressure in gas feed is 150-200 mbar, corresponding to hydrostatic pressure of $Ca(OH)_2$ suspension in the reactor.

During carbonation, the temperature of the suspension is not controlled and allowed to rise due to the heat generated in the exothermic precipitation reaction. After conductivity reached a minimum gassing is continued for another 4 minutes and then stopped.

The 16.7% w/w solids aqueous slurry of precipitated calcium carbonate obtained by this carbonation step is subsequently screened on a 45 µm screen and fed to a centrifuge for mechanical dewatering. The filter cake discharged by the centrifuge is redispersed in water and madedown into a 47.2% w/w slurry. During slurry make-down of the produced rhombohedral (R-) PCC, 1.0% w/w (calculated as dry matter on dry calcium carbonate) of a sodium polyacrylate-based anionic dispersing aid having an Mw of 12500 and a polydispersity of 2.8 is added to the mixture.

The slurry is then forced to pass through a vertical attritor mill (1.4 litre Dynomill™), containing 0.6-1.2 mm ZrO beads as media, to de-agglomerate the primarily clustered precipitated calcium carbonate into discrete particles in order to obtain an average particle size $d_{50}$ of about 0.3 µm (Micromeritics Sedigraph™ 5100) after milling.

The resulting slurry of discrete ultrafine precipitated calcium carbonate is then further upconcentrated in a vacuum evaporator to obtain final slurry solids of 66.7% w/w solids.

Physical properties of the final product are given in Table 1a below.

TABLE 1a

| PCC suspension solid content (%) | PCC suspension viscosity (mPa · s) (Brookfield DV II, 100 rpm, Spindle 3) | PCC polymorph | d50 (µm) | SSA BET (m²/g) |
|---|---|---|---|---|
| 66.7 | 850 | rhombohedral calcite (R-PCC) | 0.27 | 16.5 |

The mineral slurry so obtained is then spray-dried to a solid content>99.5 weight % (w %) and is named Mineral 1a according to the prior art.

With the same procedure as described above an equivalent R-PCC, but in presence of 2000 ppm by weight of LiOH added prior to the step regarding carbonation process to the slaked lime. During slurry make-down of the produced R-PCC 1.0% w/w (calculated as dry matter on dry calcium carbonate) of a lithium polyacrylate-based anionic dispersing aid having an Mw of 12500 and a polydispersity of 2.8 is added to the mixture.

The slurry is then forced to pass through a vertical attritor mill (1.4 litre Dynomill™), containing 0.6-1.2 mm ZrO beads as media, to de-agglomerate the primarily clustered precipitated calcium carbonate into discrete particles in order to obtain an average particle size $d_{50}$ of about 0.3 µm (Micromeritics Sedigraph™ 5100) after milling.

The resulting slurry of discrete ultrafine precipitated calcium carbonate is then further upconcentrated in a vacuum evaporator to obtain a final slurry solids of 67.7% w/w solids.

Physical properties of the final product are given in Table 1b below.

TABLE 1b

| PCC suspension solid content (%) | PCC suspension viscosity (mPa · s) (Brookfield DV II, 100 rpm, Spindle 3) | PCC polymorph | d50 (µm) | SSA BET (m²/g) |
|---|---|---|---|---|
| 67.7 | 230 | rhombohedral calcite (R-PCC) | 0.29 | 15.8 |

The slurry precipitated in presence of $Li^+$ ions has lower viscosity at even higher solids compared to the prior art slurry using 0.063 mg/m² of dispersant.

The slurry is then spray-dried>99.5 weight % solids and is named Mineral 1b according to the invention.

Test 2

This test concerns the preparation of a natural, ground calcium carbonate of Norwegian origin having a $d_{50}$ of 45 µm.

Norwegian marble rocks of the region of Molde having a diameter of 10-300 mm are autogenously dry ground to a fineness of a $d_{50}$ in the range of 42-48 µm. The mineral so obtained is named Mineral 2.

Test 3

This test concerns the preparation of a natural, ground calcium carbonate of Norwegian origin having a $d_{50}$ of 0.8 µm.

Mineral 2 is wet ground at 20 weight % solids in tap water in a vertical attritor mill (Dynomill) in a recirculation mode without adding additives, such as dispersing and/or grinding aids to a fineness till 60 weight % of the particle having a diameter of <1 µm. After grinding the product has a median diameter $d_{50}$ of 0.8 µm and a specific surface of 6.7 m²/g.

After grinding the slurry is concentrated by a tube press to form crumbles of 80-83 weight % solids.

The mineral so obtained is named Mineral 3.

Tests 4a and 4b

These tests concern the preparation of two natural, ground calcium carbonate of Norwegian origin having a $d_{50}$ of 0.6 µm.

Mineral 2 is wet ground at 15-25 weight % solids in tap water in a vertical attritor mill (Dynomill) in a recirculation mode without adding additives, such as dispersing and/or grinding aids to a fineness until 75 weight % of the particle having a diameter<1 µm. After grinding the product has a median diameter $d_{50}$ of 0.6 µm and a specific surface of 9.8 m²/g. The mineral so obtained is named Mineral 4a.

After grinding the slurry is concentrated by a filter press to form a filter-cake of 69.5 weight % solids.

The mineral so obtained is named Mineral 4b.

Test 5

This test concerns the preparation of a natural, ground calcium carbonate of Norwegian origin having a $d_{50}$ of 0.4 µm.

Mineral 2 is wet ground at 20 weight % solids in tap water in a vertical attritor mill (Dynomill) in a recirculation mode without adding additives, such as dispersing and/or grinding aids to a fineness until 85 weight % of the particle having a diameter<1 µm. After grinding the product has a median diameter of 0.4 µm.

After grinding the slurry is concentrated by a tube-press to form a filter-cake of 78 to 80 weight % solids.

The mineral so obtained is named Mineral 5.

Test 6

These tests concern the preparation of a natural, ground calcium carbonate of Norwegian origin having a $d_{50}$ of 0.6 µm.

Mineral 2 is wet ground at 78 weight % solids in tap water in a vertical attritor mill (Dynomill) in a recirculation mode using additives according to the invention and according to the prior art to a fineness until 65 weight % of the particles having a diameter<1 µm.

The mineral so obtained is named Mineral 6.

Tests 7a and 7b:

This test concerns the preparation of a scalenohedral PCC of a $d_{50}$ of 2.3 µm.

In view of such, 200 kg of calcium oxide (Tagger Kalk, Golling A) are added to 1700 litres of 40° C.-tap water in a stirred reactor; the reactor contents are mixed under continuous stirring for 30 minutes and the resulting slurry of calcium hydroxide ("milk of lime") at 13.3% w/w solids is then screened on a 100 µm screen.

The calcium carbonate precipitation is conducted in a 1800 litre cylindrical stainless steel reactor equipped with an agitator and probes for monitoring the pH and conductivity of the suspension.

1700 litres of the calcium hydroxide suspension obtained in the slaking step as stated above are added to the carbonating reactor and the temperature of the reaction mixture is adjusted to the desired starting temperature of 50° C.

A gas of 20-30% by volume of $CO_2$ in air is then bubbled upwards through the suspension at a rate of 200 m³/h under a suspension agitation of between 200 and 300 rpm. Overpressure in gas feed is 150-200 mbar, corresponding to hydrostatic pressure of $Ca(OH)_2$ suspension in the reactor.

During carbonation, the temperature of the suspension is not controlled and allowed to rise due to the heat generated in the exothermic precipitation reaction.

After conductivity reached a minimum gassing is continued for another 4 minutes and then stopped.

The product obtained by this carbonation step is subsequently screened on a 45 µm screen and recovered as a 17.4% w/w solids aqueous slurry of precipitated calcium carbonate.

Physical properties of the precipitated calcium carbonate product after carbonation are given in Table 2a below.

TABLE 2a

| PCC suspension solid content (%) | PCC suspension viscosity (mPa · s) (Brookfield DV II, 100 rpm, Spindle 2) | PCC polymorph | d50 (µm) | SSA BET (m²/g) |
|---|---|---|---|---|
| 17.4 | 15 | scalenohedral calcite (S-PCC) | 2.3 | 6.3 |

The mineral slurry so obtained is then spray-dried at a solid content of >99.5 weight % (w %) and is named Mineral 7a according to the prior art.

With the same procedure as described above an equivalent S-PCC but in presence of 500 ppm by weight of LiOH added prior do the step regarding carbonation process to the slaked lime. The slurry is then spray-dried to >99.5 weight % solids and is named Mineral 7b according to the invention.

Physical properties of the precipitated calcium carbonate product after carbonation are given in Table 2b below.

TABLE 2b

| PCC suspension solid content (%) | PCC suspension viscosity (mPa · s) (Brookfield DV II, 100 rpm, Spindle 2) | PCC polymorph | d50 (µm) | SSA BET (m²/g) |
|---|---|---|---|---|
| 17.7 | 15 | scalenohedral calcite (S-PCC) | 2.4 | 6.1 |

As can be seen in Table 2a versus Table 2b the presence of LiOH during precipitation had no influence on measured physical properties of the S-PCC.

Test 8:

This test concerns the preparation of a mixture of natural, ground chalk of French origin, and natural, ground dolomite of Norwegian origin.

1 kg of Norwegian dolomite rocks from the region of Bergen are dry ground in a ball mill to a fineness of a $d_{50}$ in the range of 10.9 µm. The obtained mineral is wetted with approximately 188 g of water, and then screening on a 63 µm sieve. 323 g of material is retained on the sieve, while the remaining 672.5 g of material passes through the sieve with water to form a suspension having a dry weight of 78.2%.

In parallel, 1 tonne of natural, ground chalk of French origin having a $d_{50}$ of 2.5 µm and an approximate humidity of 20% is dried in a rotating drier to approximately 0.2% humidity, reaching a $d_{50}$ of 1.95 µm, due to autogeneous grinding in the drier, on exiting the drier.

Then 134.5 g of the so-dried chalk is added to the dolomite suspension described above, and diluted with water to form a 73.5% solids suspension.

The mineral in this final suspension is named Mineral 8.

Example 2

This example relates to the introduction of the polyacrylate in view of dispersing spray dried PCC named Mineral 7a.

Test 9

This test illustrates the prior art.

In order to perform it, the Mineral 7a is dispersed at a solid content of 60.1 weight % using a Pendraulik toothed disc stirrer (speed of 3500 to 5000 rpm during 5 to 10 minutes) and 1.50 weight % on dry mineral of a conventional (50 mol %/50 mol %) sodium/magnesium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

Test 10

This test illustrates the invention.

In order to perform it, the Mineral 7a is dispersed at a solid content of 59.7 weight % using a Pendraulik toothed disc stirrer (speed of 3500 to 5000 rpm during 5 to 10 minutes) and 0.74 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

The results are gathered in the following table 3.

TABLE 3

| | Test number | Solid Content (weight %) | Dispersant on dry mineral (weight %) | Initial. Brookfield Viscosity 100 rpm. Spindle 3 | 8 days Brookfield Viscosity 100 rpm. Spindle 3 |
|---|---|---|---|---|---|
| Prior art | 9 | 60.1% | 1.50% | >4000 mPa · s | >4000 mPa · s |
| Invention | 10 | 59.7% | 0.74% | 117 mPa · s | <200 mPa · s |

The results demonstrate clearly the efficiency of the process using lithium-neutralised polyacrylate in order to disperse PCC, and notably demonstrate that it is impossible to obtain a PCC slurry with a solid content of about 60.0 weight % and a Brookfield viscosity less than 150 mPa·s using conventional polyacrylate.

Example 3

This example relates to the introduction of lithium neutralised polyacrylate after wet grinding in view of dispersing wet ground marble of median diameter $d_{50}$ of 0.6 μm.

Test 11

This test illustrates the prior art.

In order to perform it, 0.48 weight % on dry mineral of a conventional (50 mol %/50 mol %) sodium/magnesium neutralised polyacrylic acid of Mw=6000 and having a polydispersity of 2.5 are put in the Mineral 4a at 20 w % solids before upconcentrated in the lab in an open loop before wishing to be upconcentrated in the lab at a solid content of 68.5 weight %. Nevertheless, the trial is stopped then it is too viscous due to the high increase of Brookfield viscosity above 8000 mPa·s.

Test 12

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 68.5 weight %.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 13

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 70.0 weight %.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 14

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 70.7 weight %.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 15

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 70.7 weight %. Then an additional quantity of 0.05% of the same 100 mol % lithium neutralised polyacrylic acid is added to continue the upconcentration until a solid content of 72.0%.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 16

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 70.7 weight %. Then an additional quantity of 0.05% of the same 100 mol % lithium neutralised polyacrylic acid is added to continue the upconcentration until a solid content of 72.6%.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 17

This test illustrates the invention.

In order to perform it, 0.32 weight % on dry mineral of a 100 mol % lithium neutralised polyacrylic acid of Mw=6000 and having a polydispersity of 2.5 are put in the Mineral 4a suspension at 20 w % solids before upconcentrated in the lab in an open loop at a solid content of 70.7 weight %. Then an additional quantity of 0.05% of the same 100 mol % lithium neutralised polyacrylic acid is added to continue the upconcentration until a solid content of 73.6%.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

The results are gathered in the following table 4

TABLE 4

| | Test number | Solid Content (weight %) | Dispersant on dry mineral (weight %) | Initial. Brookfield Viscosity 100 rpm. Spindle 3 | 8 days Brookfield Viscosity 100 rpm. Spindle 3 |
|---|---|---|---|---|---|
| Prior art | 11 | 68.5% | 0.48% | Too viscous to pump >4000 mPa·s | Too viscous to pump >4000 mPa·s |
| Invention | 12 | 68.5% | 0.32% | 75 mPa·s | <200 mPa·s |
| Invention | 13 | 70.0% | 0.32% | 81 mPa·s | <200 mPa·s |
| Invention | 14 | 70.7% | 0.32% | 98 mPa·s | <200 mPa·s |
| Invention | 15 | 72.0% | 0.37% | 101 mPa·s | <200 mPa·s |
| Invention | 16 | 72.6% | 0.37% | 104 mPa·s | <200 mPa·s |
| Invention | 17 | 73.6% | 0.37% | 108 mPa·s | <200 mPa·s |

The table shows clearly the efficiency of the process using lithium-neutralised polyacrylate in order to disperse wet ground marble of median diameter $d_{50}$ of 0.6 μm.

Example 4

This example relates to the introduction of a lithium neutralised polymer after the upconcentration step in view of dispersing a filter-cake issued from an upconcentrated wet ground marble of median diameter $d_{50}$ of 0.6 μm.

Test 18

This test illustrates the prior art.

In order to perform it, the Mineral 4b is dispersed at a solid content of 55.4 weight % using a Pendraulik toothed disc stirrer (speed of 3500 to 5000 rpm during 5 to 10 minutes) and 1.05 weight % on dry mineral of a conventional (50 mol %/50 mol %) sodium/magnesium neutralised polyacrylic acid of Mw=1000 and having a polydispersity of 3.3.

The Brookfield viscosity is then measured at room temperature and at 100 rpm by the use of a Brookfield viscosimeter type RVT equipped with the spindle 3.

Test 19

This test illustrates the prior art.

In order to perform it, the Mineral 4b is dispersed at a solid content of 67.8 weight % using a Pendraulik toothed disc stirrer (speed of 3500 to 5000 rpm during 5 to 10 minutes) and 0.88 weight % on dry mineral of a conventional 100 mol % potassium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 20

This test illustrates the prior art.

In order to perform it, the Mineral 4b is dispersed at a solid content of 66.8 weight % using a Pendraulik toothed disc stirrer (speed of 3500 to 5000 rpm during 5 to 10 minutes) and 0.73 weight % on dry mineral of a conventional 100 mol % sodium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 21

This test illustrates the prior art.

In order to perform it, the Mineral 4b is dispersed at a solid content of 67.5 weight % using a Pendraulik toothed disc stirrer (speed of 3500 to 5000 rpm during 5 to 10 minutes) and 0.50 weight % on dry mineral of a conventional 100 mol % sodium neutralised polyacrylic acid of Mw=10000 and having a polydispersity of 3.4.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 22

This test illustrates the prior art.

In order to perform it, the Mineral 4b is dispersed at a solid content of 67.5 weight % using a Pendraulik toothed disc stirrer (speed of 3500 to 5000 rpm during 5 to 10 minutes) and 0.89 weight % on dry mineral of a conventional 100 mol % sodium neutralised polyacrylic acid of Mw=10000 and having a polydispersity of 3.4.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 23

This test illustrates the prior art.

In order to perform it, the Mineral 4b is dispersed at a solid content of 67.5 weight % using a Pendraulik toothed disc stirrer (speed of 3500 to 5000 rpm during 5 to 10 minutes) and 1.77 weight % on dry mineral of a conventional 100 mol % sodium neutralised polyacrylic acid of Mw=10000 and having a polydispersity of 3.4.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 24

This test illustrates the prior art.

In order to perform it, the Mineral 4b is dispersed at a solid content of 67.2 weight % using a Pendraulik toothed disc stirrer (speed of 3500 to 5000 rpm during 5 to 10 minutes) and 0.49 weight % on dry mineral of a conventional 100 mol % sodium neutralised copolymer of acrylic acid-maleic anhydride (50 weight %/50 weight %) of Mw=12000 and having a polydispersity of 3.0.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 25

This test illustrates the invention.

In order to perform it, the Mineral 4b is dispersed at a solid content of 61.6 weight % using a Pendraulik toothed disc stirrer (speed of 3500 to 5000 rpm during 5 to 10 minutes) and 0.40 weight % on dry mineral of a 100 mol % lithium neutralised polyacrylic acid of Mw=1000 and having a polydispersity of 3.3.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 26

This test illustrates the invention.

In order to perform it, the Mineral 4b is dispersed at a solid content of 66.2 weight % using a Pendraulik toothed disc stirrer (speed of 3500 to 5000 rpm during 5 to 10 minutes) and 0.14 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 27

This test illustrates the invention.

In order to perform it, the Mineral 4b is dispersed at a solid content of 66.2 weight % using a Pendraulik toothed disc stirrer (speed of 3500 to 5000 rpm during 5 to 10 minutes) and 0.16 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 28

This test illustrates the invention.

In order to perform it, the Mineral 4b is dispersed at a solid content of 66.2 weight % using a Pendraulik toothed disc stirrer (speed of 3500 to 5000 rpm during 5 to 10 minutes) and 0.29 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 29

This test illustrates the invention.

In order to perform it, the Mineral 4b is dispersed at a solid content of 69.5 weight % using a Pendraulik toothed disc stirrer (speed of 3500 to 5000 rpm during 5 to 10 minutes) and 0.17 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 30

This test illustrates the invention.

In order to perform it, the Mineral 4b is dispersed at a solid content of 64.0 weight % using a Pendraulik toothed disc stirrer (speed of 3500 to 5000 rpm during 5 to 10 minutes) and 0.23 weight % on dry mineral of a partially (85 mol %) lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 31

This test illustrates the invention.

In order to perform it, the Mineral 4b is dispersed at a solid content of 68.1 weight % using a Pendraulik toothed disc stirrer (speed of 3500 to 5000 rpm during 5 to 10 minutes) and 0.25 weight % on dry mineral of a (50 mol %/50 mol %) lithium/potassium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 32

This test illustrates the invention.

In order to perform it, the Mineral 4b is dispersed at a solid content of 63.2 weight % using a Pendraulik toothed disc stirrer (speed of 3500 to 5000 rpm during 5 to 10 minutes) and 0.21 weight % on dry mineral of a (85 mol %/15 mol %) lithium/sodium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 33

This test illustrates the invention.

In order to perform it, the Mineral 4b is dispersed at a solid content of 64.6 weight % using a Pendraulik toothed disc stirrer (speed of 3500 to 5000 rpm during 5 to 10 minutes) and 0.16 weight % on dry mineral of a (93 mol %/7 mol %) lithium/sodium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 34

This test illustrates the invention.

In order to perform it, the Mineral 4b is dispersed at a solid content of 64.6 weight % using a Pendraulik toothed disc stirrer (speed of 3500 to 5000 rpm during 5 to 10 minutes) and 0.26 weight % on dry mineral of a 100 mol % lithium neutralised polyacrylic acid of Mw=50000 and having a polydispersity of 6.25.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

Test 35

This test illustrates the invention.

In order to perform it, the Mineral 4b is dispersed at a solid content of 67.2 weight % using a Pendraulik toothed disc stirrer (speed of 3500 to 5000 rpm during 5 to 10 minutes) and 0.25 weight % on dry mineral of a (50 mol %/50 mol %) lithium/sodium neutralised copolymer of acrylic acid-maleic anhydride (50 weight %/50 weight %) of Mw=12000 and having a polydispersity of 3.0.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage. The results are gathered in the following table 5.

TABLE 5

| Test number | Solid Content (wt %) | dispersant on dry mineral (weight %) | Initial Brookfield Viscosity 100 rpm. Spindle 3 | 8 days Brookfield Viscosity 100 rpm. Spindle 3 | pH 1 hour/8 days |
|---|---|---|---|---|---|
| Prior art | 18 | 55.4% | 1.05% | 1130 mPa·s | >2000 mPa·s | — |
| Prior art | 19 | 67.8% | 0.88% | >4000 mPa·s | >4000 mPa·s | — |
| Prior art | 20 | 66.8% | 0.73% | >4000 mPa·s | >4000 mPa·s | — |
| Prior art | 21 | 67.5% | 0.50% | >4000 mPa·s | >4000 mPa·s | — |
| Prior art | 22 | 67.5% | 0.89% | >4000 mPa·s | >4000 mPa·s | — |
| Prior art | 23 | 67.5% | 1.77% | >4000 mPa·s | >4000 mPa·s | — |
| Prior art | 24 | 67.2% | 0.49% | 121 mPa·s | >500 mPa·s | 9.9/9.6 |
| Invention | 25 | 61.6% | 0.40% | 64 mPa·s | <200 mPa·s | 9.8/9.7 |
| Invention | 26 | 66.2% | 0.14% | 85 mPa·s | <200 mPa·s | 10.1/10.1 |
| Invention | 27 | 66.2% | 0.16% | 56 mPa·s | <200 mPa·s | 9.8/9.8 |

TABLE 5-continued

| Test number | Solid Content (wt %) | dispersant on dry mineral (weight %) | Initial Brookfield Viscosity 100 rpm. Spindle 3 | 8 days Brookfield Viscosity 100 rpm. Spindle 3 | pH 1 hour/8 days |
|---|---|---|---|---|---|
| Invention 28 | 66.2% | 0.29% | 64 mPa·s | <200 mPa·s | 9.8/9.8 |
| Invention 29 | 69.5% | 0.17% | 69 mPa·s | <200 mPa·s | 10.1/10.1 |
| Invention 30 | 64.0% | 0.23% | 74 mPa·s | <200 mPa·s | 10.0/10.0 |
| Invention 31 | 68.1% | 0.25% | 71 mPa·s | <200 mPa·s | 9.7/9.6 |
| Invention 32 | 63.2% | 0.21% | 52 mPa·s | <200 mPa·s | 10.0/10.2 |
| Invention 33 | 64.6% | 0.16% | 60 mPa·s | <200 mPa·s | 9.6/9.4 |
| Invention 34 | 64.6% | 0.26% | 84 mPa·s | <200 mPa·s | 10.2/10.2 |
| Invention 35 | 67.2% | 0.25% | 70 mPa·s | <200 mPa·s | 10.1/10.1 |

The table shows clearly, by comparison of a lithium-neutralised polymer with the same conventionally neutralised polymer and the corresponding solid content of the slurry, the efficiency of the process using lithium-neutralised polyacrylate in order to disperse a filter-cake issued from an upconcentrated wet ground marble of median diameter $d_{50}$ of 0.6 μm.

Example 5

This example relates to the introduction of a lithium neutralised polymer after the upconcentration step in view of dispersing hard filter crumbles of >75 w % solids issued from an upconcentrated wet ground marble of median diameter $d_{50}$ of 0.8 μm.

Test 36

This test illustrates the prior art.

In order to perform it, the Mineral 3 is dispersed at a solid content of 72.1 weight % using a Pendraulik toothed disc stirrer (speed of 3500 to 5000 rpm during 5 to 10 minutes) and 2.00 weight % on dry mineral of a conventional 100 mol % sodium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Test 37

This test illustrates the invention.

In order to perform it, the Mineral 3 is dispersed at a solid content of 72.1 weight % using a Pendraulik toothed disc stirrer (speed of 3500 to 5000 rpm during 5 to 10 minutes) and 0.24 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

The results are gathered in the following table 6.

TABLE 6

| Test number | Solid Content (weight %) | dispersant on dry mineral (weight %) | Initial Brookfield Viscosity 100 rpm. Spindle 3 | 8 days Brookfield Viscosity 100 rpm. Spindle 3 | pH 1 hour/8 days |
|---|---|---|---|---|---|
| Prior art 36 | 72.1% | 2.00% | >4000 mPa·s | >4000 mPa·s | — |
| Invention 37 | 72.1% | 0.24% | 81 mPa·s | <200 mPa·s | 10.1/9.9 |

The table shows clearly the efficiency of the process using lithium-neutralised polyacrylate in order to disperse wet ground marble of median diameter $d_{50}$ of 0.8 μm.

Example 6

This example relates to the introduction of lithium neutralised polyacrylate after wet grinding in view of dispersing a filter-cake issued from an upconcentrated wet ground marble of median diameter $d_{50}$ of 0.4 μm.

Test 38

This test illustrates the prior art.

In order to perform it, the Mineral 5 is dispersed at a solid content of 65.0 weight % using a Pendraulik toothed disc stirrer (speed of 3500 to 5000 rpm during 5 to 10 minutes) and 2.00 weight % on dry mineral of a conventional 100 mol % sodium neutralised polyacrylic acid of Mw=6000 and having a polydispersity of 2.5.

Then, it is not possible to measure the Brookfield viscosity because the calcium carbonate suspension is nearly solid.

Test 39

This test illustrates the prior art.

In order to perform it, the Mineral 5 is dispersed at a solid content of 72.1 weight % using a Pendraulik toothed disc stirrer (speed of 3500 to 5000 rpm during 5 to 10 minutes) and 0.78 weight % on dry mineral of a conventional 100 mol % sodium neutralised copolymer of acrylic acid-maleic anhydride (50 weight %/50 weight %) of Mw=12000 and having a polydispersity of 3.0.

The Brookfield viscosity is then measured at room temperature and at 100 rpm by the use of a Brookfield viscosimeter type RVT equipped with the spindle 3.

Test 40

This test illustrates the invention.

In order to perform it, the Mineral 5 is dispersed at a solid content of 72.1 weight % using a Pendraulik toothed disc stirrer (speed of 3500 to 5000 rpm during 5 to 10 minutes) and 0.24 weight % on dry mineral of a 100 mol % lithium neutralised polyacrylic acid of Mw=6000 and having a polydispersity of 2.5.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 8 days of storage at room temperature without stirring is measured after one minute of stirring at room temperature and at 100 rpm by the use of a Brookfield viscosimeter type RVT equipped with the spindle 3.

Two values of pH are measured: the initial pH after one hour of production and the 8 days pH after 8 days of storage.

The results are gathered in the following table 7.

TABLE 7

| Test Number | Solid Content (wt %) | dispersant on dry mineral (weight %) | Initial Brookfield Viscosity 100 rpm. Spindle 3 | 8 days Brookfield Viscosity 100 rpm. Spindle 3 | pH 1 hour/8 days |
|---|---|---|---|---|---|
| Prior art | 38 | 65.0% | 2.00% | Not pumpable, nearly solid | Not pumpable | |
| Prior art | 39 | 72.1% | 0.78% | 175 mPa·s | 280 mPa·s | 9.8/9.5 |
| Invention | 40 | 72.1% | 0.24% | 81 mPa·s | <200 mPa·s | 10.2/10.3 |

The table shows clearly the efficiency of the process using lithium-neutralised polyacrylate in order to disperse wet ground marble of median diameter $d_{50}$ of 0.4 μm.

Example 7

This example relates to the addition of lithium neutralised polyacrylate in two different steps of the process. The first addition is performed during the wet grinding of the PCC and the second addition is made after the grinding step and during the thermal upconcentration step of the wet ground PCC of median diameter $d_{50}$ of 0.3 μm.

Test 41

This test illustrates the invention.

In order to perform it, the Mineral 1b is wet ground at 62.5 weight % solids in tap water in presence of 0.67 weight % of a 100 mol % lithium neutralised polyacrylic acid of Mw=6000, of polydispersity of 2.5 and of a pH=8.73, in a vertical attritor mill (Dynomill) in recirculation mode to a finesse till 50 weight % of the particles having a diameter<0.3 μm.

The Brookfield viscosity then measured at room temperature and at 100 rpm by the use of a Brookfield viscosimeter type RVT equipped with the spindle 3 is equal to 78 mPa·s.

Then, this slurry is further thermal concentrated adjusting the viscosity during concentrating by further addition of the same lithium neutralised polyacrylic acid as used during grinding.

The initial Brookfield viscosity is then measured after one hour of production and after one minute of stirring at room temperature and at 100 rpm by the use of a Brookfield viscosimeter type RVT equipped with the spindle 3.

The Brookfield viscosity after 30 days of storage at 60° C. without stirring is measured after two minutes of stirring at room temperature at 1500 rpm using a conventional laboratory stirrer and the Brookfield viscosity is measured according to the same conditions and apparatus than the former tests.

Two values of pH are measured: the initial pH after one hour of production and the 30 days pH after 30 days of storage.

The obtained results are as follows in table 8:

TABLE 8

| Weight % Lithium polyacrylate added in the second step | Solid Content (weight %) | Initial Visc. Brookfield 100 rpm. Spindle 3 | Visc. Brookfield 100 rpm. Spindle 3 after 30 days | pH 1 hour/30 days |
|---|---|---|---|---|
| 0.80% | 66.0% | 128 mPa·s | <200 mPa·s | — |
| 0.80% | 67.5% | 128 mPa·s | <200 mPa·s | — |
| 0.80% | 68.6% | 160 mPa·s | <200 mPa·s | 9.6/9.7 |
| 0.89% | 70.6% | 317 mPa·s | 410 mPa·s | — |
| 0.89% | 72.1% | 607 mPa·s | 820 mPa·s | 9.8/9.8 |

Test 42

This test illustrates the prior art.

For comparison the same procedure as in Test 41 is used to produce a slurry of the same Mineral 1a with a prior art 100 mol % sodium neutralised polyacrylate of the same batch of polyacrylic acid having a polydispersity of 2.5 as above.

The obtained results are as follows in table 9:

TABLE 9

| Weight % Sodium polyacrylate added in the second step | Solid Content (weight %) | Visc. Brookfield 100 rpm. Spindle 3 |
|---|---|---|
| 0.80% | 55.0% | 2000-3000 mPa·s |
| 0.80% | 62.5% | Paste: >4000 mPa·s |

It is then impossible to get a solid content of 67 weight % by using 0.80 weight % of the sodium polyacrylate because the viscosity increases above 5000 mPa·s.

Example 8

This example illustrates the use of lithium neutralised polymer in a high solid grinding process.

Test 43

This test illustrates the prior art.

In order to perform it, the Mineral 2 is wet ground at 77-80 weight % solids in tap water in presence of a 100 mol % sodium neutralised polyacrylic acid of Mw=6000 and having a polydispersity of 2.5 in a vertical attritor mill (Dynomill) in recirculation mode to a fineness till 50 weight % of the particles having a diameter of <0.7 μm.

Test 44

This test illustrates the invention.

For comparison the same procedure is used to produce slurry with 100 mol % lithium neutralized polyacrylic acid of the same batch of polyacrylic acid having a polydispersity of 2.5 as above The obtained results are as follows in table 10:

TABLE 10

| Test | | Slurry solids Weight % | dispersant on dry mineral in weight % | Initial Brookfield Viscosity 100 rpm. Spindle 3 mPa·s | 8 days Brookfield Viscosity 100 rpm. Spindle 3 mPa·s | Size distribution Sedigraph 5100 Weight % | pH 1 hour/ 8 days |
|---|---|---|---|---|---|---|---|
| Prior art | 43 | 78.0 | 0.7 | very sticky impossible to pump into the mill | — | — | 9.3/ 9.5 |
| Invention | 44 | 78.1 | 0.58 | 149 | <200 mPa·s | <2 μm 92 <1 μm 64 <0.2 μm 16 | 9.6/ 9.4 |

The table shows clearly the efficiency of the process according to the invention.

Example 9

This example illustrates that the lithium neutralisation allows to use polymer with high polydispersity by comparing results obtained on one side by neutralising polyacrylic acid with sodium according to the prior art and on the other side by neutralising polyacrylic acid with lithium according to the invention.

Test 45

This test illustrates the prior art.

In order to perform it, the 100 mol % sodium neutralised polyacrylic acid is prepared by mixing three different 100 mol % sodium neutralised polyacrylic acids in a weight ratio of 1:1:1. It is clear for an expert that such a blend has to have a much higher polydispersity vs. each single polymer in the blend.

The first 100 mol % sodium neutralised polyacrylic acid has a Mw=1000 and a polydispersity of 3.3, the second 100 mol % sodium neutralised polyacrylic acid has a Mw=3500 and a polydispersity of 2.9, and the third has a Mw=6000 and a polydispersity of 2.5. The corresponding blend had a Mw of 3300 and a polydispersity>3.

After having prepared this 100 mol % sodium neutralised polyacrylic acid, the Mineral 4b is dispersed at a solid content of 66.9 weight % using a Pendraulik toothed disc stirrer (speed of 3000 rpm during 5 to 10 minutes) and 2.60 weight % on dry mineral of the prepared 100 mol % sodium neutralised polyacrylic acid.

The initial Brookfield viscosity is then measured after one hour of production and after one minute of stirring at room temperature and at 100 rpm by the use of a Brookfield™ viscosimeter type RVT equipped with the spindle 6.

The Brookfield™ viscosity value is 6690 mPa·s and the pH is 9.3.

Test 46

This test illustrates the invention.

In order to perform it, the 100 mol % lithium neutralised polyacrylic acid is prepared by mixing three different 100 mol % lithium neutralised polyacrylic acids in a weight ratio of 1:1:1. It is clear for an expert that such a blend has to have a much higher polydispersity vs. each single polymer in the blend.

The first 100 mol % lithium neutralised polyacrylic acid has a Mw=1000 and a polydispersity of 3.3, the second 100 mol % lithium neutralised polyacrylic acid has a Mw=3500 and a polydispersity of 2.9, and the third has a Mw=6000 and a polydispersity of 2.5. The corresponding blend had a Mw of 3300 and a polydispersity>3.

After having prepared this 100 mol % lithium neutralised polyacrylic acid, the Mineral 4b is dispersed at a solid content of 68.8 weight % using a Pendraulik toothed disc stirrer (speed of 3000 rpm during 5 to 10 minutes) and 0.23 weight % on dry mineral of the prepared 100 mol % lithium neutralised polyacrylic acid.

The initial Brookfield viscosity is then measured after one hour of production and after one minute of stirring at room temperature and at 100 rpm by the use of a Brookfield™ viscosimeter type RVT equipped with the spindle 6.

The Brookfield™ viscosity value is 70 mPa·s and the pH is 10.0.

The reading of the two results clearly shows that the use of the lithium neutralised polyacrylic acid allows to highly decrease the quantity of polymer used to obtain a well better fluid calcium carbonate suspension at a higher solid content.

Example 10

This example illustrates the use of the mineral suspension according to the invention in the coating of paper and plastic.

Test 47

This test illustrates the invention in coating application.

In order to perform it, the Mineral 4a is upconcentrated by lab-evaporation from 20 weight % to a solids content up to 75 weight %, by using a continuous addition of a 100 mol % lithium neutralised polyacrylic acid of Mw=6000 and having a polydispersity of 2.5.

Then, different samples were taken during upconcentration of Mineral 4a corresponding to different solid contents from 55.4 weight % to 75.5 weight % as well as to different quantities of polymer used from 0.203 weight % to 0.273 weight % on dry mineral are taken in view of preparing the corresponding paper coating colours prepared by using 12 parts (on dry basis) of Acronal S 360 D, BASF, a paper coating binder and 88 parts (on dry basis) and coated on a plastic support (Synteape, Argo Wiggins) at different coat weight.

The scattering coefficient S greater than 100 m²/kg for a coating weight of 20 g/m² reflecting the ability of a coating to scatter visible light is measured according to the method described in WO 02/49766 (p. 8 to 10). Accordingly, the ability to scatter light is expressed by the Kubelka-Munk light scattering coefficient, determined by the method, well-known to experts, described in the publications of Kubelka and Munk (Zeitschrift für Technische Physik 12,539, (1931)), de Kubelka (J. Optical Soc. Am. 38(5), 448, (1948) et J. Optical Soc. Am. 44(4), 330, (1954)).

The results are gathered in the following table 11.

TABLE 11

| | Test number | W % of LiPolyacrylate | Solid Content (weight %) of pigment slurry | Solid Content (weight %) of coating colour | Scattering coefficient (S) at 20 g/m² coat weight (m²/kg) |
|---|---|---|---|---|---|
| Invention | 47a | 0.203 | 55.4 | 53.0 | 199.5 |
| Invention | 47b | 0.234 | 65.2 | 60.0 | 194.5 |
| Invention | 47c | 0.256 | 69.1 | 60.0 | 177.4 |
| Invention | 47d | 0.264 | 71.0 | 60.0 | 151.8 |
| Invention | 47e | 0.264 | 72.3 | 60.0 | 147.3 |

TABLE 11-continued

|  | Test number | W % of LiPolyacrylate | Solid Content (weight %) of pigment slurry | Solid Content (weight %) of coating colour | Scattering coefficient (S) at 20 g/m² coat weight (m²/kg) |
|---|---|---|---|---|---|
| Invention | 47f | 0.264 | 73.8 | 60.0 | 140.5 |
| Invention | 47g | 0.273 | 75.5 | 60.0 | 125.8 |

The table shows clearly the efficiency of the process using lithium-neutralised polyacrylate in order to disperse wet ground marble of median diameter $d_{50}$ of 0.6 µm in a coating application.

Test 48

This test illustrates the invention.

In order to perform it, Mineral 2 (which has a BET specific surface area of 1.4 m²/g) was wet ground at 77 wt % solids in tap water in presence of 0.33 wt %, relative to the dry weight of mineral, of a 93 mol % lithium/7 mol % sodium neutralized polyacrylic acid of Mw=6000, of Mn=2400 g/mol and having a polydispersity of 2.5, in a 1500-litre vertical pearl mill containing 0.6-1 mm zirconium silicate grinding beads, operating in continuous mode to reach a fineness such that 58 wt % of the particles have a diameter of <2 µm.

At the inlet of the mill, the slurry of Mineral 2 had a pH of 9.7. The maximum temperature at the outlet of the mill attained during grinding was 97° C. The obtained mineral was in the form of 80.5 wt % solids slurry and is named Mineral 9. This slurry had a Brookfield viscosity at 25° C. of 175 mPa·s measured at 100 rpm.

Thereafter, the suspension of Mineral 9 was formulated in a paper coating color consisting, in parts per hundred parts of dry Mineral 9, of the following:

8 parts of carboxylated styrene-butadiene synthetic binder having particles with a diameter of between 0.08 to 0.12 µm;

0.1 parts carboxymethyl cellulose;

0.5 parts of an acrylate rheology modifier.

The obtained coating color has a solids content of 77% by dry weight and a Brookfield viscosity at 25° C. of 510 mPa·s measured at 100 rpm. The good viscosity, among other properties, translated in a good runnability during subsequent paper coating.

Example 11

This example relates to the introduction of different quantities of lithium neutralised polyacrylate after wet grinding in view of dispersing wet ground marble of median diameter $d_{50}$ of 0.6 µm.

Test 49

This test illustrates the prior art.

In order to perform it, different quantities of a conventional (100 mol %) 2-amino-2-methyl-1-propanol (AMP) neutralised polyacrylic acid of Mw=6000 and having a polydispersity of 2.5 are put into the Mineral 4b at 66.1 w % solids.

The initial Brookfield viscosity is then measured after one hour of production and after one minute of stirring at room temperature and at 100 rpm by the use of a Brookfield viscosimeter type RVT equipped with the spindle 3.

Test 50

This test illustrates the invention.

In order to perform it, different quantities of a (50 mol %/50 mol %) AMP/lithium hydroxide neutralised polyacrylic acid of Mw=6000 and having a polydispersity of 2.5 are put into the Mineral 4b at 68.6 w % solids.

The initial Brookfield viscosity is then measured after one hour of production and after one minute of stirring at room temperature and at 100 rpm by the use of a Brookfield viscosimeter type RVT equipped with the spindle 3.

The results are gathered in the following table 12.

TABLE 12

|  | Test number | Solid Content (weight %) | dispersant on dry mineral (weight %) | Initial Brookfield Viscosity 100 rpm. Spindle 3 |
|---|---|---|---|---|
| Prior art | 49a | 66.1% | 0.50% | >4000 mPa·s |
| Prior art | 49b | 66.1% | 1.05% | 3000 mPa·s |
| Prior art | 49c | 66.1% | 1.28% | 3000 mPa·s |
| Prior art | 49d | 66.1% | 1.48% | 3000 mPa·s |
| Prior art | 49e | 66.1% | 1.98% | 3250 mPa·s |
| Invention | 50a | 68.6% | 0.28% | 1450 mPa·s |
| Invention | 50b | 68.6% | 0.40% | 476 mPa·s |
| Invention | 50c | 68.6% | 0.43% | 252 mPa·s |
| Invention | 50d | 68.6% | 0.48% | 132 mPa·s |
| Invention | 50e | 68.6% | 0.49% | 123 mPa·s |
| Invention | 50f | 68.6% | 0.52% | 119 mPa·s |

The table shows clearly the efficiency of the process using lithium-neutralised polyacrylate in order to disperse wet ground marble of median diameter $d_{50}$ of 0.6 µm Test 51

This test illustrates the prior art.

In order to perform it, 0.73 weight % on dry calcium carbonate of a conventional 100 mol % sodium neutralised polyacrylic acid of Mw=6000 and having a polydispersity of 2.5 are put into the Mineral 4b at 65.5 w % solids.

The initial Brookfield viscosity is then measured after one hour of production and after one minute of stirring at room temperature and at 100 rpm by the use of a Brookfield viscosimeter type RVT equipped with the spindle 3.

Test 52

This test illustrates the invention.

In order to perform it, the carboxylic groups of the poly(ethylene-acrylic acid) were neutralized using lithium hydroxide. The molar ratio of monomer of the poly(ethylene-acrylic acid) was 80/20. Such neutralized EAA was put into the Mineral 4b at 65.5 w % solids.

The initial Brookfield viscosity is then measured after one hour of production and after one minute of stirring at room temperature and at 100 rpm by the use of a Brookfield viscosimeter type RVT equipped with the spindle 3.

The results are gathered in the following table 13.

TABLE 13

|  | Test number | Solid Content (weight %) | Dispersant on dry mineral (weight %) | Initial Brookfield Viscosity 100 rpm. Spindle 3 |
|---|---|---|---|---|
| Prior art | 51 | 65.5% | 0.73% | >3000 mPa·s |
| Invention | 52a | 65.5% | 0.08% | 1490 mPa·s |
| Invention | 52b | 65.5% | 0.104% | 228 mPa·s |
| Invention | 52c | 65.5% | 0.116% | 200 mPa·s |
| Invention | 52d | 65.5% | 0.171% | 165 mPa·s |
| Invention | 52e | 65.5% | 0.284% | 170 mPa·s |

One part of the sample of the test 52e is then stored at rest during 1 day, 3 days 6 days and the Brookfield viscosity is then measured after one minute of stirring at room temperature and at 100 rpm by the use of a Brookfield viscosimeter type RVT equipped with the spindle 3.

The results are 216 mPa·s, 247 mPa·s and 308 mPa·s, respectively.

Another part of the sample stored at room temperature under stirring during 7 days gives a Brookfield viscosity of 274 mPa·s These results as well as the one gathered in table 13 show also the efficiency of the lithium neutralised polymer according to the invention.

Example 12

This example relates to dispersing a mixture of screened natural, dry-ground dolomite and natural, dry-ground chalk, by introduction of lithium neutralised polyacrylate.

Test 53

This test illustrates the invention.

1082 g of the suspension of Mineral 8 obtained in Test 8 is dispersed by addition, under shearing in a beaker using a tooth disc stirrer (of 4 cm diameter), of 0.035%, based on the dry weight of the suspension, of polyacrylate in the form of a 35 wt-% solution, wherein 100% of the carboxyl groups are lithium neutralised, and the polyacrylate has a polydispersity of 2.5. The obtained suspension has a Brookfield viscosity (measured at 100 rpm using disc 3) of 160 mPa·s.

It is to remark that under these stirring conditions in the presence of dolomite, the chalk fraction of Mineral 8 is further divided.

The resulting dispersion is thereafter screened on a 63 μm sieve, recovering 12.2 g on the screen, while the remaining 783 g of solids passes through the sieve with water to form a diluted suspension having a dry weight of 72.3%.

Example 13

This example illustrates the use of lithium neutralized polymer in a high solid two-step continuous grinding process at industrial scale (i.e. for the manufacturing of products in tons).

Test 54

This test illustrates the invention.

In order to perform it, Mineral 2 (which has a BET specific surface area of 1.4 m²/g) was wet ground at 76.5 wt % solids in tap water in presence of 0.3% by weight, relative to the dry weight of mineral, of a 93 mol % lithium/7 mol % sodium neutralized polyacrylic acid of Mw=6000, of Mn=2400 g/mol and having a polydispersity of 2.5, in a 160-litre vertical pearl mill containing 300 kg of 0.6-1 mm zirconium silicate grinding beads, under a feed rate of Mineral 2 of 245 litres/hours, operating in continuous mode to reach a fineness such that 60 weight % of the particles have a diameter of <2 um. At the inlet of the mill, the slurry of Mineral 2 had a pH of 9.7. The maximum temperature at the outlet of the mill attained during grinding was 73° C. The obtained mineral was in the form of 80 weight % solids slurry and is named Mineral 10. This slurry had a Brookfield viscosity at 25° C. of 185 mPa·s measured at 100 rpm. Mineral 10 had a BET specific surface area of 8.4 m²/g.

Mineral 10 was then diluted to reach a solids content of 78% by weight, and further ground in the same mill as above under a feed rate of Mineral 10 of 235 litres/hours, dosing 0.3% by weight, relative to the dry weight of mineral, of a 93 mol % lithium/7 mol % sodium neutralized polyacrylic acid of Mw=6000, of Mn=2400 g/mol and a polydispersity of 2.5, at the inlet of the mill, and dosing 0.1% by weight, relative to the dry weight of mineral, of this same polymer at the outlet of the mill. The grinding was performed such that particles exiting the mill featured the following particle size distribution:

91% by weight<2 um
62.4% by weight<1 um

At the inlet of the mill, the slurry of Mineral 10 had a pH of 10.1. The maximum temperature at the outlet of the mill attained during grinding was 90° C. The obtained mineral was in the form of an 80.3 weight % solids slurry and is named Mineral 10. This slurry had a Brookfield viscosity at 25° C. of 335 mPa·s measured at 100 rpm, and a pH of 9.8. Mineral 10 had a BET specific surface area of 13.1 m²/g.

The invention claimed is:

1. An aqueous mineral material obtained by the process comprising the steps of:
    (a) providing at least one mineral material comprising calcium carbonate in the form of an aqueous suspension or in dry form,
    (b) providing at least one partially or totally lithium-neutralized water-soluble polyacrylic acid, wherein the molar rate of lithium neutralized acid groups is 50% to 100% and the molar rate of non-lithium neutralized acid groups is 50% to 0%, so that 100% of the acid groups of the water-soluble polyacrylic acid are neutralized; and
    (c) grinding and/or dispersing and/or upconcentrating the at least one mineral matter of step (a) in the presence of from 0.05 wt % to 1 wt %, relative to the total dry mineral material, of the at least one partially or totally lithium-neutralized water-soluble organic polyacrylic acid of step (b) in water to obtain an aqueous mineral material comprising calcium carbonate and the at least one partially or totally lithium-neutralized water-soluble polyacrylic acid,
    wherein the aqueous mineral material so obtained has a final solids content of 60 to 81 wt. % and a Brookfield viscosity of less than 200 mPa·S after 1 minute of stirring at a rotation speed of 100 rpm at room temperature, when measured one hour after production of the aqueous mineral material and after eight days of unstirred storage of the aqueous mineral material.

2. The aqueous mineral material according to claim 1, wherein the calcium carbonate is marble, chalk, limestone, or any mixture thereof.

3. The aqueous mineral material according to claim 1, wherein the at least one partially or totally lithium neutralized water-soluble polyacrylic acid is totally or partially neutralized by a lithium ion containing base or by a combination of a lithium ion containing base with one or more neutralization agents having a monovalent neutralizing function or a polyvalent neutralizing function, or any mixture thereof.

4. The aqueous mineral material according to claim 3, wherein the monovalent function is selected from the group consisting of an alkaline cation, sodium, potassium, ammonium, a primary, secondary or tertiary aliphatic and/or cyclic amine, stearylamine, monoethanolamine, diethanolamine, triethanolamine, cyclohexylamine, methylcyclohexylamine, aminomethylpropanol, morpholine, an alkaline earth divalent cation, magnesium, calcium, zinc, strontium, a trivalent cation, aluminium, or a cation of higher valency.

5. The aqueous mineral material according to claim 1, wherein the at least one partially or totally lithium-neutralized water-soluble polyacrylic acid is a lithium neutralized polyacrylic acid.

6. The aqueous mineral material according to claim 1, wherein the at least one partially or totally lithium-neutralized water-soluble polyacrylic acid is a lithium/sodium neutralized polyacrylic acid.

7. The aqueous mineral material according to claim 1, wherein the water-soluble polyacrylic acid has a weight average molecular weight of 3000 to 12,000 g/mol.

8. The aqueous mineral material according to claim 1, wherein aqueous mineral material obtained in step (c) has a solids content of 65 to 80 wt. %, or is adjusted to have a solids content of 65 to 80 wt. %.

9. The aqueous mineral material according to claim 1, wherein the water-soluble polyacrylic acid has a polydispersity of more than 2.

10. The aqueous mineral material according to claim 1, wherein the water-soluble polyacrylic acid has a polydispersity of from 2.5 to 4.0.

11. The aqueous mineral material according to claim 1, having a d50 of from 0.2 to 2 μm, determined using a Sedigraph 5100™.

12. The aqueous mineral material according to claim 1, having a fraction of particles finer than 2 μm of more than 80 wt %, and/or fraction of particles finer than 1 μm of more than 75 wt % based on the total weight of dry mineral material, using a Sedigraph™ 5100.

13. The aqueous mineral material according to claim 1, which is dried.

14. A paper coating color comprising the aqueous mineral material according to claim 1 or dried mineral material thereof.

15. A paper comprising the aqueous mineral material according to claim 1 or dried mineral material thereof.

16. A plastic comprising the aqueous mineral material according to claim 1 or dried mineral material thereof.

17. A paint comprising the aqueous mineral material according to claim 1 or dried mineral material thereof.

* * * * *